Patented May 3, 1932

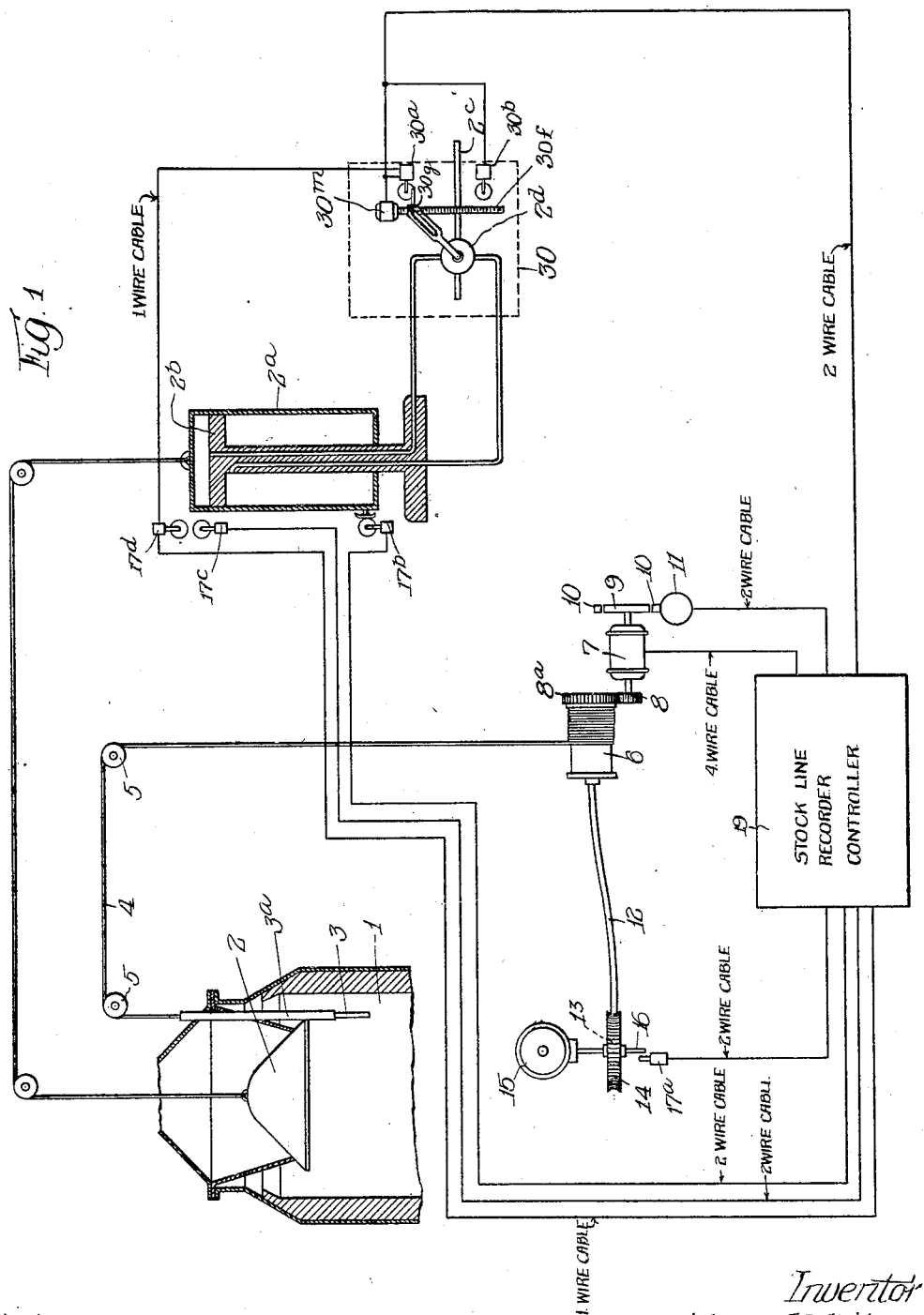

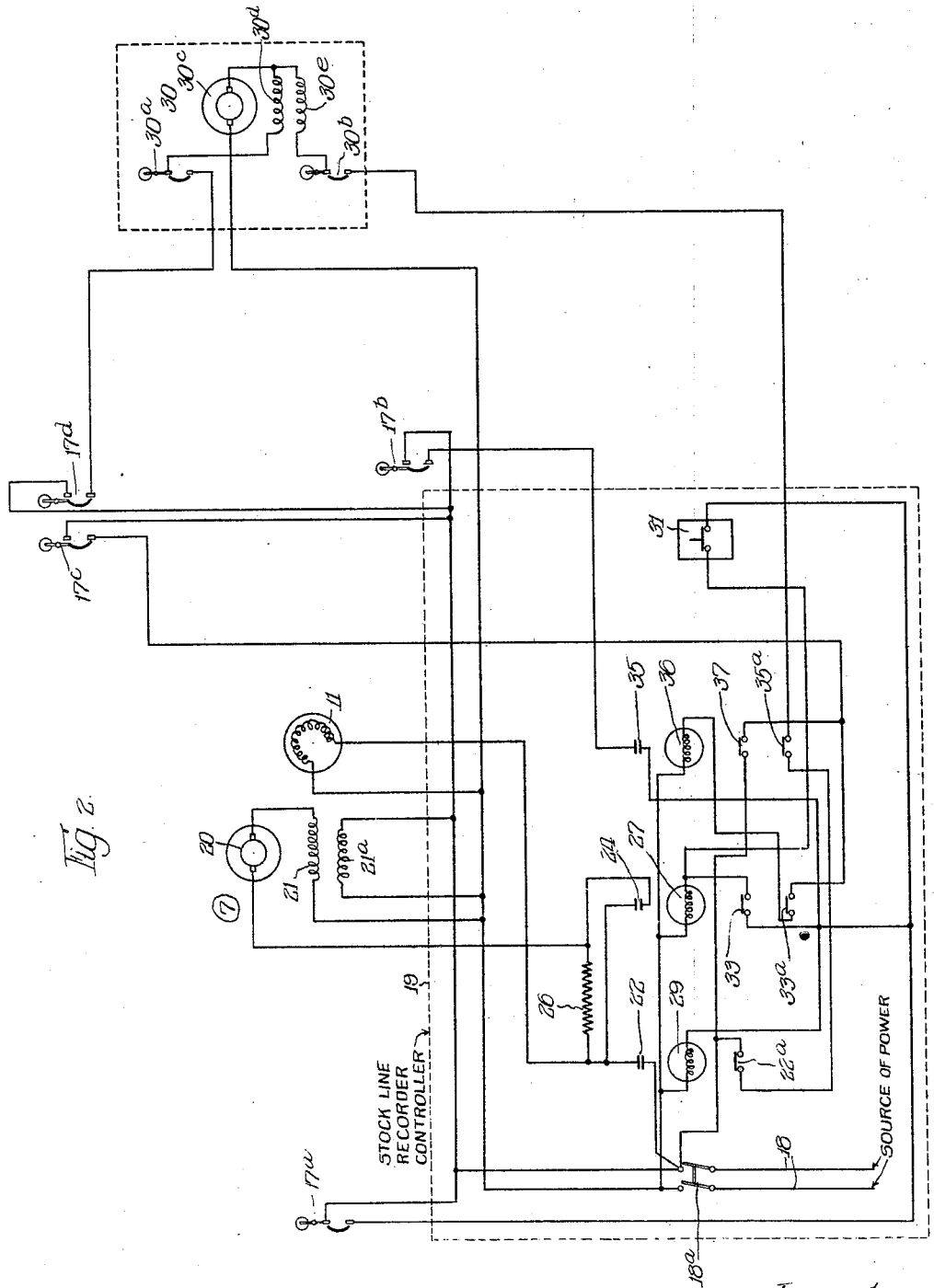

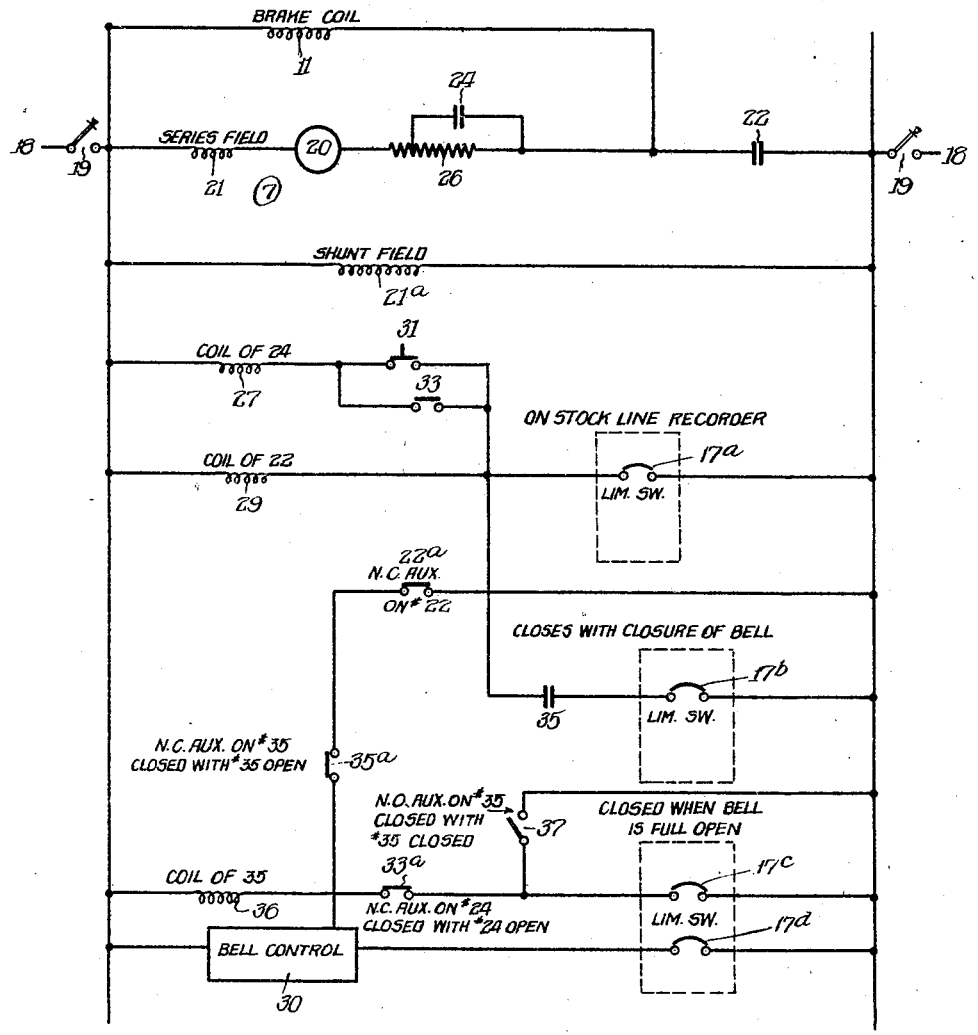

1,856,897

UNITED STATES PATENT OFFICE

ARTHUR J. WHITCOMB, OF CHICAGO, ILLINOIS, ASSIGNOR TO FREYN ENGINEERING COMPANY, OF CHICAGO, ILLINOIS, A CORPORATION OF MAINE

STOCK LINE RECORDER

Application filed September 3, 1927. Serial No. 217,448.

The present invention relates to stock line recorders.

More particularly the present invention relates to means for giving a continuous indication of the level of material within a receptacle and will be described in connection with the charge within a blast furnace.

The present invention contemplates means for providing a continuous indication of the level of the charge within a blast furnace and has for one of its objects the provision of means for accomplishing this purpose which is well adapted to meet the needs of commercial service.

A further object is to provide a means for continuously indicating the level of the charge within a blast furnace, which means will have improved accuracy over prior devices and which will at once indicate a rise in the charge even though said rise is caused by conditions other than the deposition of added material into the blast furnace.

A further object is to provide a level indicator including a weighted test member having a cable attached thereto for operating same, which level indicator has the advantage that said cable will be maintained taut under all conditions.

A further object is to provide an improved method for continuously indicating the level of the contents within a blast furnace or the like.

Further objects will appear as the description proceeds.

Referring to the drawings—

Figure 1 is a diagrammatic view illustrating one embodiment of the present invention;

Figure 2 is a schematic view illustrating the electrical connections which may be utilized in connection with the apparatus shown in Figure 1; and Figure 3 is a wiring diagram showing the electric connections of Figure 2 in more compact form and omitting the showing of details of certain of the instrumentalities shown in Figure 2.

A detailed explanation of the present invention may be prefaced by a short statement of the functions of the apparatus above referred to.

The present invention contemplates the use of a weighted test or try rod which may have a movement of reciprocation in a vertical direction within a blast furnace or other receptacle. A plurality of test rods may be provided, but only one test rod and the control means therefor have been illustrated in the drawings, inasmuch as the illustration of one test rod and its control means will be sufficient in explaining the invention. Said test rod is preferably held in a vertical position at all times, and may be lifted by means of a flexible connector or cable, which in turn is controlled by a winding drum or equivalent means. Said winding drum or equivalent means is driven through suitable gear reductions or other power transmitting means from an electric motor, which may be shunt or compound wound. The shaft of said motor may be provided with a brake wheel, which may be controlled by a brake biased to braking position. Electrical control means may be provided for releasing said brake. A recording meter may be provided driven from the shaft of said winding drum, said meter being operated by any well known means to produce the result that the amount of deflection of the stylus of said meter is proportional to the amount of rotation of the winding drum. Means are contemplated for opening a limit switch after a predetermined rotation of said winding drum. A typical cycle of operation may be stated as follows: Operation of a start button or equivalent means connects the driving motor of said winding drum to a source of electric current, a relatively large amount of resistance being provided in series with the motor. The brake above referred to is released by this same operation. The motor is connected across the source of electric current in such a way that said motor develops torque tending to cause the winding drum to hoist the test rod. However, the resistance in series with said motor is of such value that insufficient current is applied to said motor to develop a torque of sufficient value to cause the winding drum to hoist, so that the net result is that the test rod descends and causes the winding drum to overcome the opposing torque of the motor. The test rod descends until it rests upon the charge, and the motor continues to develop a torque tending to raise the test rod, the result being that the cable connecting the test rod to the winding drum is kept taut. Should the charge in the blast furnace rise at any time, the test rod will be raised, and automatically the winding drum will take up the slack in the cable. Should the charge fall, the test rod will descend, causing the cable to be unreeled from the winding drum. Consequently, for each change of level of the charge within the blast furnace, corresponding movements are given to the winding drum, which produces a deflection of the stylus of the recording meter in proportion to the amount of rotation of the winding drum.

Means are provided for connecting the control means of the charging bell of the blast furnace with the operating means for the test rod, whereby before the charging bell of said blast furnace has opened, the test rod is hauled up. Interlocking means which will occur to those skilled in the art may be provided for accomplishing this result. Operation of a push button or equivalent means inaugurates the operation of instrumentalities short-circuiting a portion or all of the resistance in series with the motor connected to the winding drum. This permits the motor to obtain more current, causing the motor to develop sufficient torque to cause the winding drum to raise the test rod to the top of the furnace. When the test rod reaches the top of the furnace, a limit switch is operated, causing the operation of certain instrumentalities, to be referred to hereinafter, to disconnect the motor from the line and causing the brake to set, with the result that the test rod is held at the top of the furnace. As soon as the charging bell has completed its operation, said start button above referred to or equivalent instrumentalities may be operated (which instrumentalities may be interlocked with the bell control), causing the motor to be again connected across the line in series with this resistance, thereby initiating the cycle hereinabove described, causing the test rod to descend to the level of the charge and to resume a continuous indication of such level.

Referring more particularly to the drawings, a blast furnace 1 is indicated having the charging bell 2, which may be of any usual type. Said charging bell 2 may be operated by any preferred mechanism, suitable mechanism for the purpose being diagrammatically indicated in Figure 1 and being indicated by the numeral 2a. Mounted within the blast furnace 1 is the test rod 3, which test rod is guided for straight line movement within the sleeve 3a, whereby said test rod always occupies a vertical position. Said test rod is controlled by means of the cable or flexible connector 4 disposed upon the sheaves 5—5. Said cable 4 is connected to the winding drum 6, which may be grooved if preferred. An electric motor 7 is provided for turning the drum 6, a pinion 8 being indicated upon the motor shaft adapted to engage with the gear 8a coaxially mounted with the winding drum 6. The shaft of the electric motor 7 is provided with the brake wheel 9, which brake wheel is controlled by the brake shoes 10—10, which shoes are normally biased to braking position. A brake coil 11 is provided, which when energized is adapted to hold the brake shoes 10—10 out of braking relationship with the brake wheel 9. Driven synchronously with the winding drum 6 is the flexible shaft 12 adapted to drive the worm 13. Said worm 13 engages the worm wheel 14, which worm wheel is adapted to drive the recording meter 15. The worm wheel 14 is adapted, through connections not shown, to control the lever 16 for operating the normally closed limit switch 17a, which is one of a plurality of limit switches to be referred to hereinafter. The instrumentalities above referred to are controlled electrically by means which for purposes of description may be referred to as the stock line recorder controller, which controller is indicated in Figures 1 and 2 by the numeral 19.

Figures 2 and 3 show the electrical connections of the mechanism shown in Figure 1. The numerals 18—18 indicate the two sides of an electric circuit, which circuit may be controlled by the blades 18a—18a of a double pole switch. The electric motor 7 comprises the armature 20, the series field winding 21 and the shunt field winding 21a, said armature and series field winding being connected in series with the resistance 26 across the conductors 18—18, through the contactor 22, which contactor 22 is biased to open position. Bridged across the resistance 26 is the contactor 24, which contactor 24 is biased to open position. The shunt field winding 21a is connected across the conductors 18—18. Also connected across the circuit comprising the series field winding 21, armature 20 and the resistance 26 is a circuit including the brake coil 11, which controls the brake shoes 10—10 cooperating with the brake wheel 9. Bridged across the conductors 18—18 is a circuit including the operating coil 29 of the contactor 22 and the normally closed limit switch 17a. The limit switch 17a is so connected to the winding drum 6 that said limit switch 17a is caused to open when the winding drum has reeled up sufficient cable 4 to hoist the test rod 3 to the top of the furnace 1. The limit switch 17a is biased to closed position, being caused to open only when the test rod 3 reaches the aforesaid position at the top of the furnace. Bridged across the operating coil 29 is a circuit including the operating coil 27 of the contactor 24 and the push button or equivalent switch 31. Shunted around the push button switch 31 is the auxiliary switch 33, which is mechanically actuated by the contactor 24 and is open when contactor 24 is open. Bridged across the limit switch 17a is a circuit including the contactor 35 and the normally open limit switch 17b. The limit switch 17b is located on the operating mechanism of the charging bell 2 in such a manner that it is closed when said charging bell 2 is closed. Said limit switch 17b is biased to open position and is closed only when the charging bell 2 is closed. Bridged across the conductors 18—18 is a circuit including the coil 36 of the contactor 35, the normally closed auxiliary switch 33a, and the normally open limit switch 17c. The normally closed auxiliary switch 33a is closed when contactor 24 is open and is open when contactor 24 is closed. The limit switch 17c is so connected to the operating mechanism 2a of the charging bell 2 that it will be closed when said charging bell 2 is completely open. Said limit switch 17c is biased to open position and is closed only when the charging bell 2 is open. Shunted around the limit switch 17c is a circuit including the auxiliary switch 37, which is caused to function by the contactor 35 and is open when said contactor 35 is open. Also bridged across the conductors 18—18 is a circuit including the limit switch 17d and certain control mechanism indicated by the numeral 30 for controlling the operating mechanism 2a of the charging bell 2. The details of the control mechanism 30 form no part of the present invention, and suitable control mechanism will readily occur to those skilled in the art. A suitable control mechanism 30 will be briefly referred to hereinbelow. The function of the circuit immediately above referred to is to cause the charging bell 2 to open upon the occurrence of a predetermined event, such for example as the completion of the hoisting of the test rod 3. Bridged across the conductors 18—18 is the limit switch 17d and the charging bell control mechanism 30. The limit switch 17d is located adjacent to the operating mechanism 2a of the charging bell 2 at the same level at which the limit switch 17c is located. Limit switch 17d is biased to open position and operates simultaneously with and in a manner similar to limit switch 17c. Bridged across the conductors 18—18 is a circuit, including the bell control 30, the normally closed auxiliary switch 35a (closed when contactor 35 is open), and the normally closed auxiliary 22a (closed when contactor 22 is open).

At this point in the description a brief statement may be made of the salient features of a control mechanism 30 which may be employed in the practice of the present invention. Referring to Figure 1, the bell operating mechanism comprises a cylinder 2a which may be operated by compressed air so as to cause the lowering and hoisting of the bell 2. When air is admitted to the top side of the piston 2b, the cylinder 2a is hoisted, causing lowering of the bell 2, and when air is admitted to the bottom side of the piston 2b, the cylinder is lowered, thereby causing hoisting or closing of the bell 2. The compressed air may be taken from any convenient source, such for example as the turbo blower supplying air to the blast furnace. The pipe 2c is connected to such a source. Compressed air is admitted to the top or bottom of the piston 2b by means of a four-way valve 2d, which valve is operated by a motor indicated by the character 30m, which consists of an armature 30c and two series field windings 30d and 30e. The motor 30m is shown as being in driving relationship with a screw 30f having a traveling nut 30g adapted to engage selectively the two limit switches 30a and 30b. Said field windings 30d and 30e are adapted to be used alternatively and are oppositely wound, whereby the use of one of said field windings 30d or 30e causes motor rotation in one direction, while the use of the other of said field windings causes rotation in the reverse direction. Hereinabove a circuit has been referred to which is bridged across the conductors 18 and which includes the normally closed auxiliary switch 22a, the normally closed auxiliary switch 35a and the bell control mechanism 30. Said circuit may be traced through the bell control mechanism 30 as follows: through the normally closed limit switch 30b, which is actuated by the valve 2d when said valve has been operated to the limit of its travel in one direction, the series field winding 30e and the armature 30c of the motor 30m, which operates the valve 2d. Also bridged across the conductors 18—18 is a circuit including the normally open limit switch 17d, the normally closed limit switch 30a, the series field winding 30d and the armature 30c of the motor 30m, which operates the valve 2d. The limit switch 30a is operated by the valve 2d when the bell has traveled a predetermined distance in the direction opposite to that which causes the actuation of the limit switch 30b.

A typical cycle of operation is as follows: For the purpose of this description a cycle will be assumed as beginning with the test rod 3 resting upon the charge in the furnace or receptacle. Under this condition the contactor 22 will have been closed by means of a circuit completed through the coil 29 of contactor 22. This circuit comprises the coil 29, the contactor 35 (which is closed as hereinafter described), and the limit switch 17b, which is closed while the bell operating mechanism 2a is in a position to cause the bell 2 to be closed. At the time this circuit was completed, contactor 22 was closed, which completed a circuit from one conductor 18 through the series field winding 21, through the armature 20, through the resistance 26 and through said contactor 22 to the other conductor 18. The result of the closing of the last mentioned circuit is that the motor 7 is placed across the conductors 18—18 in series with the resistance 26. Said resistance 26 is of sufficient value to cause the motor 7 to develop torque sufficient to reel up slack in the cable 4, but the torque is not sufficiently great to cause the winding drum 6 to lift the test rod 3. Consequently, if for any reason the burden within the blast furnace should rise, the test rod 3 will rise, the cable 4 will be reeled up and a corresponding movement of the drum 6 will be indicated through the flexible shaft 12, worm 13, worm wheel 14 and recording meter 15. Should the burden fall, the test rod 3 will descend, causing the cable 4 to be reeled off the winding drum 6, giving a corresponding indication on the recording meter 15. When a dump of the charging bell 2 is desired, the push button switch or equivalent switch 31 is operated, thereby completing circuit from one conductor 18 through the coil 27 of the contactor 24, through the push button switch 31, through the normally closed limit switch 17a, to the other conductor 18. This results in the closure of the contactor 24. Closure of contactor 24 closes the auxiliary switch 33, said auxiliary switch 33 being mechanically connected to and operated by contactor 24, which results in bridging the push button switch 31, thereby forming a sustaining circuit around said push button switch 31 after pressure is released from said push button switch 31. Closure of contactor 24 opens the normally closed auxiliary switch 33a thereon (closed when contactor 24 is open), which opens the circuit through coil 36 of contactor 35, thereby causing contactor 35 to open. This does not interrupt circuit through coil 24 of contactor 22 because of the bridging circuit through the limit switch 17a. The limit switch 17a is closed at all times, except when the test rod 3 is hoisted to the top of the furnace. This action causes contactor 35 to open, thereby transferring circuit through coil 29 of contactor 22 from the limit switch 17b to the limit switch 17a. Consequently, the coil 29 of contactor 22 is now governed by the action of limit switch 17a. Closure of contactor 24 shunts out the resistance 26 which is in series with the armature 20 of the motor 7. The motor 7 is thereby caused to develop sufficient torque to cause the winding drum 6 to hoist the test rod 3 to the top part of the furnace or receptacle 1. When the test rod 3 reaches the top of the furnace, the normally closed limit switch 17a is opened, to thereby open circuit from conductor 18 through coil 29 of contactor 22 and coil 27 of contactor 24, thereby causing said two contactors 22 and 24 to open. The opening of contactor 22 results in disconnecting the motor 7 from one side of the line, and also disconnects the brake operating coil 11 from the source of supply, with the result that the motor 7 stops and the brake shoes 10—10 are applied. Consequently, the test rod 3 is held at the top of the furnace 1. The opening of contactor 24 causes the closing of normally closed switch 33a thereon, which closure results in no further action at this time. Simultaneous with the opening of contactor 22 is the closing of the normally closed auxiliary switch 22a. This completes a circuit from one of the conductors 18 through the normally closed auxiliary switch 35a, through the control 30 of the charging bell mechanism 2a, to the other conductor 18. This circuit, in passing through the control mechanism 30, passes from the auxiliary switch 22a and through the auxiliary switch 35a, through the normally closed limit switch 30b, through the series field winding 30e, and through the armature 30c to the conductor 18. This causes the operation of the valve 2d to admit compressed air to the top of the cylinder 2a, thereby causing the bell 2 to lower. When said valve reaches its limit of travel the normally closed limit switch 30b is opened, thereby interrupting the circuit to the series field winding 30e and the armature 30c of the valve operating motor, causing it to stop. The result is that the charging bell 2 is caused to open. When said bell 2 is completely open, the normally open limit switch 17c (which is operated by the bell operating mechanism 2a) is closed, thereby completing a circuit across the conductors 18—18 including the coil 36 of contactor 35, the normally closed auxiliary switch 33a and limit switch 17c. Completion of this circuit causes contactor 35 to close. Closure of contactor 35 closes the auxiliary switch 37 thereon, said switch 37 being mechanically operated by contactor 35 and closed when contactor 35 is closed. Closure of the auxiliary switch 37 forms a bridging circuit around the limit switch 17c. Closure of the contactor 35 causes no further action at this time. Simultaneous with the closure of the limit switch 17c, the limit switch 17d is closed, said limit switch 17d, as above described, being positioned to be operated by the cylinder 2a of the charging bell 2 and caused to function when said bell 2 is in the full open position. Closure of said limit switch 17d completes a circuit across the conductors 18—18 through said limit switch 17d and the charging bell control mechanism 30. The circuit through the bell control mechanism may be traced as follows: From the limit switch 17d, the circuit continues through the limit switch 30a, the series field winding 30d and the armature 30c to the conductor 18. This causes the motor to reverse the operation of the valve 2d, thereby cutting off air from the top side of the piston of the cylinder 2a and admitting air to the bottom side, which action causes the bell 2 to be hoisted or closed. When the valve 2d has reached its limit of travel in the reverse direction the limit switch 30a will open, thereby interrupting circuit to the valve operating motor 30m, causing it to stop. When the bell 2 is completely closed the normally open limit switch 17b closes, thereby completing a circuit across the conductors 18—18, including the coil 29 of the contactor 22, contactor 35 and said limit switch 17b. (Contactor 35 has been already closed as hereinbefore described.) Completion of this circuit causes contactor 22 to close. Closure of contactor 22 completes a circuit across the conductors 18—18 including the brake coil 11, which causes the brake shoes 10—10 to release the brake wheel 9. Closure of said contactor 22 also completes a circuit across the conductors 18—18, including the series field winding 21, the armature 20 of the motor 7 and the resistance 26. Completion of this last mentioned circuit causes the motor 7 to develop a torque tending to cause the winding drum 6 to reel up the cable 4 and hold the test rod 3 at the top of the furnace 1. Inasmuch as the torque developed by the weight of the test rod 3 pulling on the cable 4 on the drum 6 is greater than the torque developed by the motor 7 transmitted to the drum 6 through the gears 8 and 9, the test rod 3 descends until it rests upon the charge in the furnace. As the test rod 3 descends, the winding drum 6 acting through the flexible shaft 12, worm 14 and worm wheel 13 causes the lever 16 to close the limit switch 17a. Closure of the limit switch 17a bridges the circuit from the coil 29 of contactor 22 through contactor 35 and limit switch 17b to conductor 18 as hereinbefore stated. The try-rod descends until it rests upon the stock in the furnace 1, whereupon it stops and shows the movement of the stock as hereinbefore described.

From the foregoing it will be clear that the present invention provides a system which will give a continuous indication of the level of charge within a blast furnace or other receptacle, which will respond at once to changes in said level, and which will always maintain a taut cable, whereby to render it certain that a change of indication means a change in stock level and not merely a change in the tightness of the cable.

Though a preferred embodiment of the present invention has been described in detail, it will be clear that many modifications will occur to those skilled in the art. It is intended to cover all such modifications that fall within the scope of the appended claims.

What is claimed is—

1. In a device for continuously indicating fluctuations in level, in combination, a receptacle the level of the contents of which is to be indicated, a weighted test member adapted to rest for prolonged periods of time upon the top of said contents, an electric motor for raising said test member, a cable connected to said test member adapted to be wound up by said motor, means for limiting the pull of said motor upon said cable to a value sufficient to hold said cable taut without lifting said test member from said contents, a closure for said receptacle, operating means for said closure and means responsive to a raised position of said test member for controlling said closure operating means.

2. In a blast furnace, in combination, a charging bell, operating means therefor, a test member adapted to rest upon the charge within said blast furnace, a cable connected to said test member, an electric motor for applying a tension to said cable, a control circuit for said motor, said control circuit including means adapted under predetermined conditions to cause said motor to exert a torque sufficient to keep said cable taut when said test member is upon said charge but insufficient to lift said test member, said control circuit including means for increasing the torque of said motor, when it is desired to lift said test member from said charge, said bell operating means being responsive to a raised position of said test member.

3. In a blast furnace, in combination, a charging bell thereof, operating means for said bell, a test member adapted to rest upon the charge within said blast furnace, a cable connected to said test member, an electric motor, control means for said motor adapted under predetermined conditions to limit the pull of said motor upon said cable to that sufficient to hold same taut but insufficient to lift said test member, and means responsive to a raised position of said test member for modifying said bell operating means to cause the opening of said bell.

4. In a blast furnace, in combination, a charging bell thereof, operating means for said bell, a test member adapted to rest upon the charge within said blast furnace, a cable connected to said test member, an electric motor, control means for said motor adapted under predetermined conditions to limit the pull of said motor upon said cable to that sufficient to hold same taut but insufficient to lift said test member, means for modifying said control means to cause said motor to lift said test member and means responsive to a raised position of said test member for modifying said bell operating means to cause the opening of said bell.

5. In a blast furnace in combination, a charging bell thereof, operating means for said bell, a level indicator comprising, in combination, a weighted test member, a cable connected to said test member, an electric motor for exerting a pull upon said cable, recording means responsive to the movement of said electric motor, electric control means for said motor, said electric contol means including means adapted under predetermined conditions to cause said motor to exert only sufficient pull upon said cable to keep said cable taut and under other predetermined conditions to exert sufficient pull upon said cable to lift said test member and means responsive to a lifted position of said test member for controlling said bell operating means.

6. In a blast furnace, in combination, a charging bell thereof, operating means for said bell, a level indicator for the charge within said furnace, said level indicator comprising a weighted test member, a cable connected thereto, an electric motor for exerting a pull upon said cable, brake means for said motor biased to braking relationship with said motor when said test member is at a predetermined position above the normal level of charge in said blast furnace, switch means for deenergizing said motor when said test member is in said predetermined position, and means for preventing operation of said charging bell while said test member is in level indicating position.

7. In a blast furnace, in combination, a charging bell, operating means for said bell, a test member for indicating the level of the charge within said furnace, a cable for raising said test member, a motor for exerting pull upon said cable, brake means for said motor biased to braking relationship with said motor when said test member is at a predetermined position out of indicating relationship with the charge within said furnace, and means for releasing said brake means in response to the operation of said bell operating means.

8. In a blast furnace, in combination, a charging bell thereof, operating means for said bell, a test member for indicating the level of charge within said furnace, a cable connected to said test member, a motor for exerting a pull upon said cable, control means for said motor, said control means including means for governing the torque of said motor to keep said cable taut without raising said test member, means for increasing the torque of said motor to raise said test member and means responsive to a raised position of said test member for controlling said bell operating means.

9. In a blast furnace, in combination, a charging bell thereof, operating means for said bell, a test member for indicating the level of charge within said blast furnace, a cable connected to said test member, an electric motor for exerting a pull upon said cable, brake means for said motor biased to braking relationship therewith, electric control means for said motor, said electric control means including means for causing said motor to exert a continuous pull upon said cable when said test member is in level indicating position, means for controlling said motor to lift said test member out of level indicating position when said bell is about to open, and means for releasing said brake means when said bell has returned to closed position.

10. In a blast furnace, in combination, a charging bell thereof, operating means for said bell, a test member for indicating the level of charge within said blast furnace, a cable connected to said test member, an electric motor for exerting a pull upon said cable, brake means for said motor biased to braking relationship therewith, electric control means for said motor, said electric control means including means for causing said motor to exert a continuous pull upon said cable when said test member is in level indicating position, means responsive to said bell operating means for controlling said motor to lift said test member out of level indicating position before said bell can be opened, and means for releasing said brake means when said bell has returned to closed position, said control means for said motor including means for causing said motor to exert only sufficient torque to hold said cable taut and insufficient torque to raise said test member when said test member is in level indicating position.

11. In a blast furnace, in combination, a charging bell, operating means therefor, a test member adapted to rest upon the charge within said blast furnace, a cable connected to said test member, an electric motor for applying a tension to said cable, a control circuit for said motor for causing said motor to exert a torque sufficient to keep said cable taut when said test member is upon said charge but insufficient to lift said test member, said control circuit including means for increasing the torque of said motor to lift said test member from said charge and means responsive to a raised position of said test member for controlling said bell operating means.

12. In a blast furnace, in combination, a charging bell, a weighted test member, a flexible cable connected to said test member, a motor connected to said cable, a brake for holding said test member in an uppermost position, means responsive to said bell for releasing said brake, and control means for said motor, said control means including means for limiting the pull of said motor upon said cable to a value sufficient to hold said cable taut but insufficient to lift said test member, said control means also including means for modifying said limiting means whereby said motor may lift said test member.

13. In a blast furnace, in combination, a charging bell, a weighted test member, a flexible cable connected to said test member, a motor connected to said cable, a brake for holding said test member in an uppermost position, means responsive to said bell for releasing said brake, control means for said motor, said control means including means for limiting the pull of said motor upon said cable to a value sufficient to hold said cable taut but insufficient to lift said test member, said control means also including means for modifying said limiting means whereby said motor may lift said test member, and connecting means between said bell and said control means for said motor for insuring a predetermined sequence of operation of said test member and said bell.

14. In combination, in a receptacle the level of the contents of which is to be indicated, a weighted test member adapted to rest for prolonged periods of time upon the top of said contents, an electric motor for raising said test member, a cable connected to said test member adapted to be wound up by said motor, means for limiting the energization of said motor to a value such that said motor will exert a pull upon said cable sufficient to hold said cable taut without lifting said test member from said contents, means for controlling said limiting means to cause said motor to raise said test member, a closure for said receptacle and operating means for said closure, said operating means being responsive to the position of said test member.

15. A level indicator comprising a weighted test member, a cable connected thereto, an electric motor connected to said cable, and control means for said motor, said control means including limiting means for limiting the energization of said motor to a value whereby said motor will exert a pull upon said cable sufficient to hold said cable taut but insufficient to raise said test member, whereby when said test member becomes raised or lowered through other means, said motor will rotate to take up or pay out cable, a closure for said receptacle and operating means for said closure, said operating means being responsive to the position of said test member.

16. In a device for continuously indicating fluctuations in level, in combination, a receptacle, the level of the contents of which is to be indicated, a closure for said receptacle, operating means for said closure, a weighted test member, a cable connected thereto, an electric motor connected to said cable, control means for said motor, said control means including limiting means for limiting the pull of said motor upon said cable to a value such that said motor exerts, under predetermined conditions, a continuous pull upon said cable sufficient to hold said cable taut but insufficient to raise said test member, whereby when said test member becomes raised or lowered through other means said motor will rotate to take up a pay out cable and means responsive to a raised position of said test member for controlling said closure operating means.

Signed at Chicago, Illinois, this 29 day of Aug., 1927.

ARTHUR J. WHITCOMB.